Dec. 31, 1935.   S. C. FULTON ET AL   2,025,738
ALUMINUM CHLORIDE SYNTHESIS OF RESINS AND PRODUCT THEREOF
Filed April 7, 1932
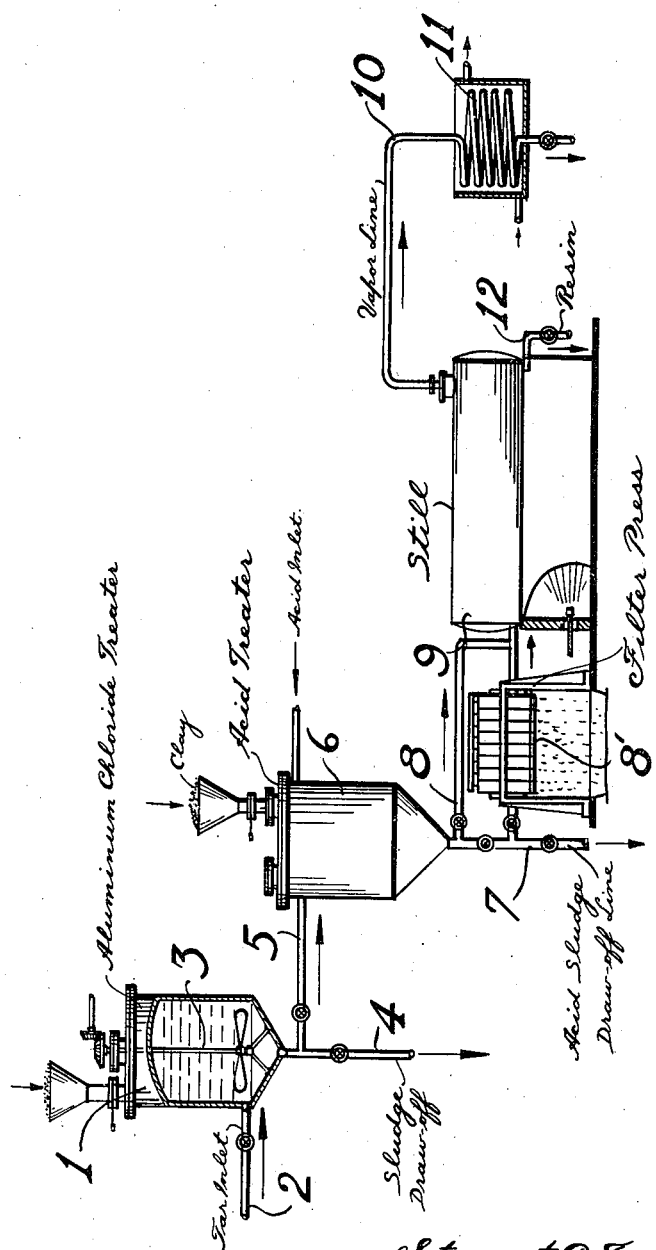
Stewart C. Fulton
John Kunc   INVENTORS
BY
W. E. Currie   ATTORNEYS.

Patented Dec. 31, 1935

2,025,738

UNITED STATES PATENT OFFICE 2,025,738

ALUMINUM CHLORIDE SYNTHESIS OF RESINS AND PRODUCT THEREOF

Stewart C. Fulton, Elizabeth, and John Kunc, Roselle Park, N. J., assignors to Standard Oil Development Company, a corporation of Delaware Application April 7, 1932, Serial No. 603,796

11 Claims. (Cl. 260—2)

This invention relates to the synthesis of resins by treating heavy petroleum products of tarry nature, especially cracked tar of petroleum origin, with metallic halides, especially aluminum chloride. In a modification of the process a distillate obtained from the petroleum tar, especially cracked tar, is treated with the aluminum chloride.

The invention will be fully understood from the following description when read in conjunction with the drawing, the sole figure of which is a diagrammatic side elevation, partly in section of the apparatus used for carrying out the invention.

According to this invention the cracked petroleum tar or distillate obtained from cracked petroleum tar is agitated with anhydrous aluminum chloride for several hours while at an elevated temperature, of say between 120 to 180° C. It will be understood that the temperature range may vary within somewhat broader limits. The amount of aluminum chloride may be from 2 to 10% or more. Instead of aluminum chloride other anhydrous metal chlorides, such as anhydrous iron chloride, zinc chloride, etc., may be used. After agitation the sludge is settled from the hot product, the oil cooled to approximately room temperature and then treated with sulfuric acid of approximately 95% concentration although more dilute acid or more concentrated acid may also be used. The amount of acid may vary within broad limits, say from 1–10% or more of the material treated. The sludge formed by the acid treatment is separated by settling when fluid or filtration when granular and the residual product is either agitated with finely divided clay such as Attapulgus fines and the clay separated by filtration, or the residual product is water washed with or without the addition of alkali. The treatment of the product with clay or alkali or water may be carried out at room temperature and will remove any acidity left in it. In order to facilitate the acid treatment the aluminum chloride treated oil may be mixed after the separation of the aluminum chloride sludge with a light hydrocarbon such as petroleum naphtha and then treated with the acid as described above.

After the acid treatment the oily constituents are distilled off preferably under high vacuum leaving as distillation residue the resin.

It is important to carry out the aluminum chloride and the acid treatment in the above described sequence, namely first treating the tar with the aluminum chloride and then with the acid, because our experience has taught us that much better yields are obtained by this method than in methods where the tar is treated first with the sulfuric acid and then with the aluminum chloride. We do not know the exact cause of this circumstance but assume that in the reverse sequence when the tar is first treated with acid and then with aluminum chloride, the acid treatment removes part of the oily constituents which would condense to resins during the aluminum chloride treat. There is also evidence that the acid polymerizes certain of the compounds present in the tar to oily polymers boiling too high to permit separation by distillation. In addition these oily polymers are inert towards further reaction in the presence of aluminum chloride. The resulting resins are consequently of low softening point.

It will be also observed that the resins obtained by our process are partly present in the cracked tar and partly formed during the aluminum chloride treatment. The acid treatment mainly serves for improving the color of the final resin.

The cracked tar may be either treated with the aluminum chloride and acid as such or it may be reduced by distilling off say 50% of its oily constituents and treating only the residue. We may also distill off from the cracked tar practically all the oily constituents until bottoms of about 220–240° F. softening point (ball and ring method) are obtained. The resins contained in the bottoms may be separated by extraction with a selective solvent such as petroleum naphtha, as described in the co-pending application of Stewart C. Fulton, filed October 30, 1931, under Serial No. 572,059. The distillate obtained from the tar which has a high initial boiling point of say 260° F. under 1 mm. mercury absolute pressure may be treated with aluminum chloride and acid by the method described above. The acid treatment may also be eliminated in this case and the resin obtained directly by distilling off the oily constituents from the aluminum chloride treated distillate after the separation of the aluminum chloride sludge and agitation with finely divided clay at room temperature and separation of the clay by filter pressing.

Referring to the figure, numeral 1 designates the aluminum chloride treater which may be heat insulated or surrounded by a heating jacket (not shown), 2 the tar inlet, 3 an agitator, 4 sludge draw-off and 5 the transfer line for the aluminum chloride treated product. The anhydrous aluminum chloride may be added into the treater 1 by any of the known means. Numeral 6 designates the acid treater in which the clay agitation or the alkali and/or water washing may also be carried out. Numeral 7 designates the draw-off line from treater 6, 8 the transfer line leading into still 9 and 8′ a filter press for removing clay when used for neutralization. The still is preferably operated under high vacuum and which has an overhead vapor line 10, condenser 11 and a bottom draw-off line 12. The operation of the apparatus is obvious from the above description of the process.

The following examples will illustrate our process:

1,000 grams of 50% reduced cracked petroleum tar having a gravity of 3° A. P. I. was agitated with 5% of anhydrous aluminum chloride at a temperature of 148° C. for three hours and the sludge removed. The product was then allowed to cool to room temperature and was treated with 5% of 95% sulfuric acid. After removal of the acid sludge the resulting product was neutralized with Attapulgus fines and after removal of the clay by filter pressing was distilled under 1 mm. mercury absolute pressure until a yellowish resin of 191° F. softening point (ball and ring method) was obtained. The yield of the resin was 11% based on the reduced tar.

In another operation the overhead product obtained by distilling off the oily constituents from the cracked petroleum tar was treated with 7% of aluminum chloride under conditions as in the previous examples. After separation of the aluminum chloride sludge and agitation with Attapulgus fines and removal of the clay, the product was submitted to distillation under vacuum until a resin of softening point of 180° F. was obtained. The yield of the resin was 5.5% based on the tar distillate.

The resins obtained by our process are formed by the polymerizing action of aluminum chloride upon the cyclic constituents contained in the cracked petroleum tar product. When the tar distillate is treated the resins are formed only by the action of the aluminum chloride, while when the total tar is treated the final resin contains products formed by the action of the aluminum chloride and also products which were already present in the tar and were formed during the cracking. The physical and chemical characteristics of our resins whether produced from the total tar or tar distillate are similar. Such resins are unsaponifiable, yellow to reddish brown products soluble in light petroleum naphtha, linseed oil, China-wood oil, esters and benzol, insoluble in water, lower alcohols and acetone. They have a comparatively low iodine number, usually between 40 and 60 and most often around 50.

The iodine number is determined by the so-called Hanus method described in the Bureau of Mines Technical Paper No. 181, page 6 (1917).

Our process may be modified in various ways and we do not wish that our invention be limited by any of the particular details disclosed for the purpose of illustration but only by the following claims in which it is our intention to claim all novelty inherent in the invention:

What we claim is:

1. A process of producing resin, which comprises agitating a polymerizable material selected from the class consisting of cracked petroleum tar and distillates thereof, with a metal halide having the polymerizing action of aluminum chloride, at a polymerizing temperature, settling and drawing off the metal halide sludge, treating the sludge-free reaction product with sulfuric acid, removing the acid sludge and distilling off the oily constituents from the product remaining after the removal of the acid sludge until a resin is obtained as distillation residue.

2. The process according to claim 1 in which the acid treated product is neutralized before distillation.

3. The process according to claim 8 which comprises the additional step of neutralizing the aluminum chloride sludge-free product with finely divided clay and separating the clay before the distillation step.

4. Process according to claim 1, in which the polymerizing treatment is carried out at a temperature between the approximate limits of 120 to 180° C.

5. Process according to claim 1, in which the liquid polymerization product is purified by treating with 1 to 10% of sulfuric acid (of about 95% strength).

6. Process according to claim 1 in which the liquid polymerization product is mixed with a light hydrocarbon diluent and is then purified by treating with 1 to 10% of concentrated sulfuric acid.

7. A resin derived by treating a material selected from the class consisting of cracked petroleum tar and distillates thereof, with a metallic halide polymerizing agent having the polymerizing action of aluminum chloride and subsequently treating the resulting polymerization products with sulphuric acid.

8. Process for producing resins which comprises agitating a distillate, boiling above about 260° F. at 1 mm. mercury absolute pressure, from a cracked petroleum tar with a metal halide having the polymerizing action of aluminum chloride at a polymerizing temperature, and separating from the resulting reaction products the resin contained therein.

9. Process according to claim 8 in which said metal halide is aluminum chloride.

10. Process according to claim 8 in which said polymerizing temperature is within the range of 120 to 180° C.

11. Process according to claim 8 comprising settling said resulting reaction products and drawing off the metal halide sludge and distilling off the oily constituents from the product remaining after the removal of said sludge until a resin is obtained as a distillation residue.

STEWART C. FULTON.
JOHN KUNC.